United States Patent
Ishikawa et al.

(10) Patent No.: US 8,009,756 B2
(45) Date of Patent: Aug. 30, 2011

(54) PEAK SUPPRESSING AND RESTORING METHOD, TRANSMITTER, RECEIVER, AND PEAK SUPPRESSING AND RESTORING SYSTEM

(75) Inventors: Hiroyoshi Ishikawa, Kawasaki (JP);
Hajime Hamada, Kawasaki (JP);
Nobukazu Fudaba, Kawasaki (JP);
Yuichi Utsunomiya, Kawasaki (JP);
Kazuo Nagatani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/478,932

(22) Filed: Jun. 5, 2009

(65) Prior Publication Data

US 2010/0003920 A1 Jan. 7, 2010

(30) Foreign Application Priority Data

Jul. 3, 2008 (JP) ................. 2008-174684

(51) Int. Cl.
*H04B 15/00* (2006.01)
*H04B 1/10* (2006.01)
*H04L 25/49* (2006.01)
*H04L 27/08* (2006.01)

(52) U.S. Cl. ........ 375/285; 375/296; 375/297; 375/345; 375/346

(58) Field of Classification Search ........... 375/285, 375/295, 296, 297, 316, 345, 346; 455/63.1; 332/107, 123, 163, 164; 329/319, 349
See application file for complete search history.

(56) References Cited

U.S. PATENT DOCUMENTS

| 3,403,327 | A | * | 9/1968 | Welz | 324/339 |
|---|---|---|---|---|---|
| 5,287,387 | A | * | 2/1994 | Birchler | 375/296 |
| 5,880,629 | A | | 3/1999 | Maeda | |
| 6,009,090 | A | | 12/1999 | Oishi et al. | |
| 7,751,786 | B2 | * | 7/2010 | McCallister et al. | 455/115.1 |
| 2001/0010709 | A1 | | 8/2001 | Iwamatsu et al. | |
| 2003/0112891 | A1 | | 6/2003 | Ozaki | |
| 2006/0046764 | A1 | * | 3/2006 | Ohba et al. | 455/522 |
| 2009/0291653 | A1 | * | 11/2009 | Suzuki et al. | 455/127.2 |
| 2009/0323857 | A1 | * | 12/2009 | Singh et al. | 375/297 |

FOREIGN PATENT DOCUMENTS

| JP | 8-163198 | 6/1996 |
|---|---|---|
| JP | 9-321675 | 12/1997 |
| JP | 10-178414 | 6/1998 |
| JP | 10178414 | 6/1998 |
| JP | 2001-274768 | 10/2001 |

OTHER PUBLICATIONS

European Search Report dated Nov. 30, 2009, from the corresponding European Application.
Wolfgang Meier, et al. "Software Amplitude Limitation in Digital Signal Processing Applications" Motorola Technical Developments, Motorola Inc., vol. 25, Jul. 1, 1995, pp. 23-27.
Korean Intellectual Property Office Notice of Preliminary Rejection dated Nov. 29, 2010, from the corresponding Korean Application.

* cited by examiner

*Primary Examiner* — Tesfaldet Bocure
(74) *Attorney, Agent, or Firm* — Katten Muchin Rosenman LLP

(57) ABSTRACT

A peak suppressing and restoring method includes suppressing a peak of a signal, starting suppression when a suppression start value is lower than a suppression target value, using a function of a gain characteristic such that a peak amplitude value attains the suppression target value, and restoring the suppressed peak of the signal using an inverse function of the function of the gain characteristic.

10 Claims, 15 Drawing Sheets

PEAK SUPPRESSING AND RESTORING METHOD, TRANSMITTER, RECEIVER, AND PEAK SUPPRESSING AND RESTORING SYSTEM

CROSS-REFERENCE TO RELATED APPLICATION

This application is based upon and claims the benefit of priority of the prior Japanese Patent Application No. 2008-174684, filed on Jul. 3, 2008, the entire contents of which are incorporated herein by reference.

FIELD

Embodiments of the present invention relate to a peak suppressing and restoring method, transmitter, receiver, and peak suppressing and restoring system that suppress and restore a peak of a signal in communication.

BACKGROUND

In communication, such as wireless communication, a technique for suppressing a peak of a transmission signal has been used for improving the electric power use efficiency of an amplifier. That is, the electric power use efficiency of the amplifier improves as the amplifier is operated close to saturation electric power. Thus, by suppressing a peak component of a signal through peak suppression in advance, the amplifier operates as close as possible to saturation electric power.

For example, a technique illustrated in FIG. 1 is known as a method of suppressing a peak and a method of restoring a suppressed peak. In this technique, a transmitter suppresses a peak, and then transmits peak suppression information related to peak suppression integrated with transmission data. Then, a receiver receives the peak suppression information, and then uses the received peak suppression information to restore the peak-suppressed signal (see Japanese Laid-open Patent Publication No. 2001-274768).

In addition, a peak suppressing method using hard clipping is known as a technique for suppressing a peak. Specifically, the peak suppressing method is a method in which a gain is determined so that a peak of a signal that exceeds a suppression target value is clipped to the target value. Note that as a technique related to hard clipping, a technique for suppressing a steep variation in a signal by applying a predetermined function to round the shoulder of the waveform after peak suppression (see FIG. 2) is known in order to suppress a steep variation in signal at a point at which suppression through hard clipping is started (see Japanese Laid-open Patent Publication No. 10-178414).

Here, in the technique for transmitting peak suppression information, the transmitter allocates a frequency for transmitting peak suppression information. As a result, there is a problem that frequencies that are allocatable to a user are reduced and, therefore, frequency use efficiency decreases.

SUMMARY

According to an aspect of the embodiments discussed herein, a peak suppressing and restoring method is provided. The peak suppressing and restoring method includes suppressing a peak of a signal by starting suppression when a suppression start value is lower than a suppression target value and using a function of a gain characteristic such that a peak amplitude value attains the suppression target value, and restoring the suppressed peak of the signal using an inverse function of the function of the gain characteristic.

Additional objects and advantages of the embodiments will be set forth in part in the description which follows, and in part will be obvious from the description, or may be learned by practice of the embodiments. The object and advantages of the embodiments will be realized and attained by means of the elements and combinations particularly pointed out in the appended claims.

It is to be understood that both the foregoing summary description and the following detailed description are exemplary and explanatory and are not restrictive of the embodiments, as claimed.

DESCRIPTION OF EMBODIMENTS

First Embodiment

Hereinafter, the configuration and process flow of each of a transmitter and a receiver according to a first embodiment will be described sequentially, and lastly advantageous effects according to the first embodiment will be described.
(Configuration of Transmitter)

First, the configuration of a transmitter 10 according to the first embodiment illustrated in FIG. 3 will be described with reference to FIG. 3 to FIG. 6.

Figure 1:
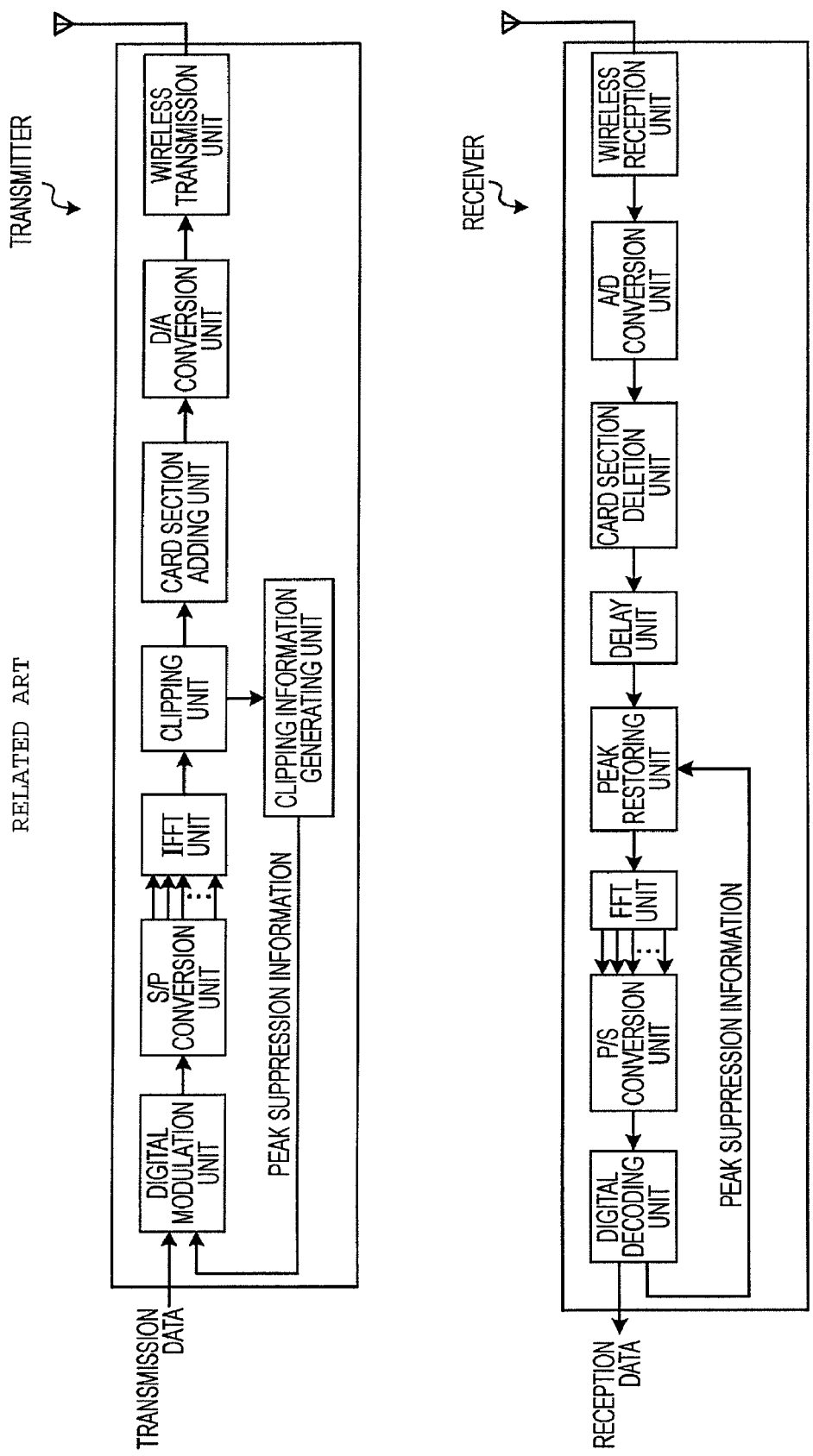
FIG. 1 is a block diagram illustrating a prior art.
Figure 2:
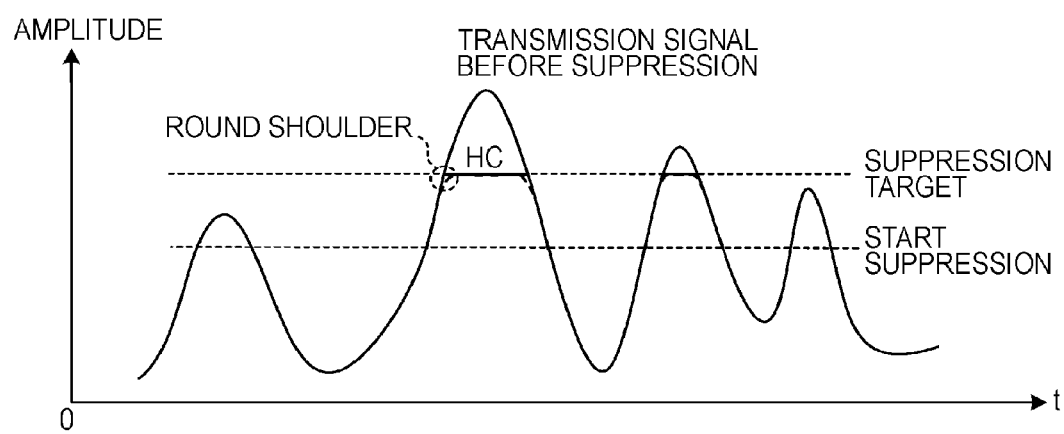
FIG. 2 is a graph illustrating the prior art.
Figure 3:
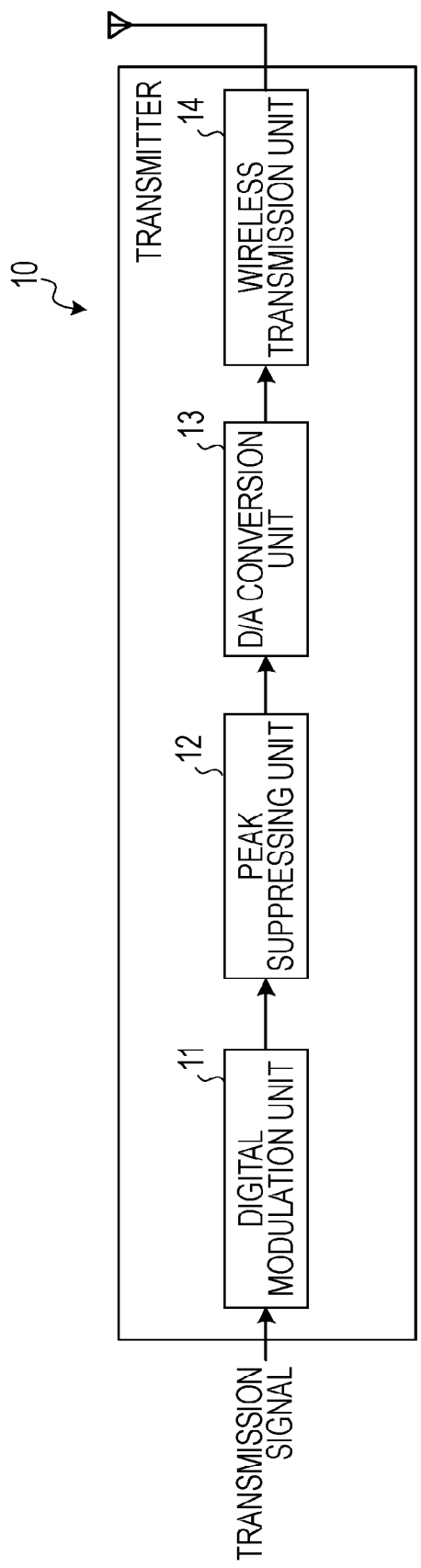
FIG. 3 is a block diagram that illustrates the configuration of a transmitter according to a first embodiment.

As illustrated in FIG. 3, the transmitter 10 includes a digital modulation unit 11, a peak suppressing unit 12, a D/A conversion unit 13, and a wireless transmission unit 14, and transmits a signal to a receiver 20 through an antenna. Hereinafter, the processes of these units will be described.

The digital modulation unit 11 digitally modulates input transmission data, and outputs the digitally modulated transmission data to the peak suppressing unit 12 as a transmission signal. The peak suppressing unit 12 starts suppression when a suppression start value is smaller than a suppression target value, suppresses a peak of the signal using a function f(x) having gain characteristics such that only a peak amplitude value attains the suppression target value, and then outputs the resultant signal to the D/A conversion unit 13.

Figure 4:
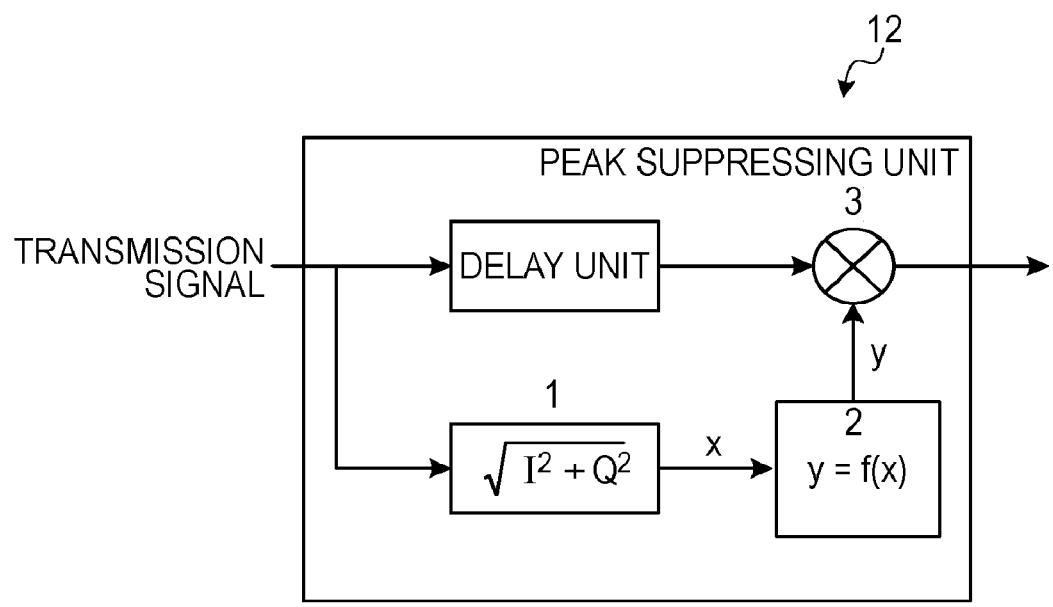
FIG. 4 is a view illustrating a peak suppressing unit of the transmitter.

As illustrated in FIG. 4, the peak suppressing unit 12 accepts the transmission signal output from the digital modulation unit 11, obtains an amplitude value (x) of the transmission signal, which is a complex number (see operation 1 in FIG. 4), and calculates a peak suppression signal (y) using the function f(x) (see operation 2 in FIG. 4). Then, the peak suppressing unit 12 multiplies the transmission signal, delayed by a delay unit, by the peak suppression signal (gain) to suppress a peak (see operation 3 in FIG. 4).

Here, the process using the function f(x) in the peak suppressing unit will be described in detail using the example illustrated in FIG. 5. In the example illustrated in FIG. 5, for comparison, an example in which peak suppression is carried out by existing hard clipping is illustrated together with an example in which a peak of the signal is suppressed using the function f(x).

Figure 5:
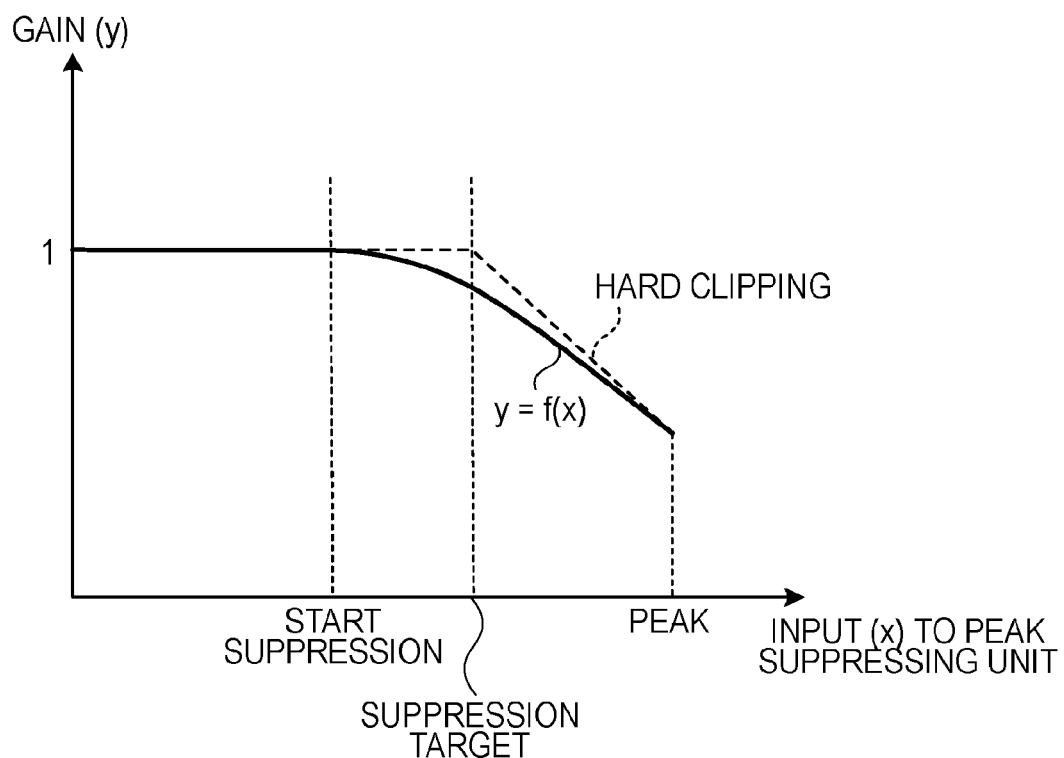
FIG. 5 is a graph illustrating the process of the peak suppressing unit.

As illustrated in FIG. 5, in the hard clipping, a gain is determined so that a peak signal that exceeds a suppression target value is clipped to the target value. In contrast, the peak suppression process executed by the peak suppressing unit 12 using the function f(x) differs from the hard clipping in that peak suppression is carried out when an amplitude value is lower than a suppression target value (in the example illustrated in FIG. 5, from the level of "start suppression"). In addition, the peak suppressing unit 12 determines a gain substantially equal to that of the hard clipping at the maximum peak of the signal, but the peak suppressing unit 12 determines a gain that performs peak suppression on peaks other than the maximum peak more severely than hard clipping.

Figure 6:
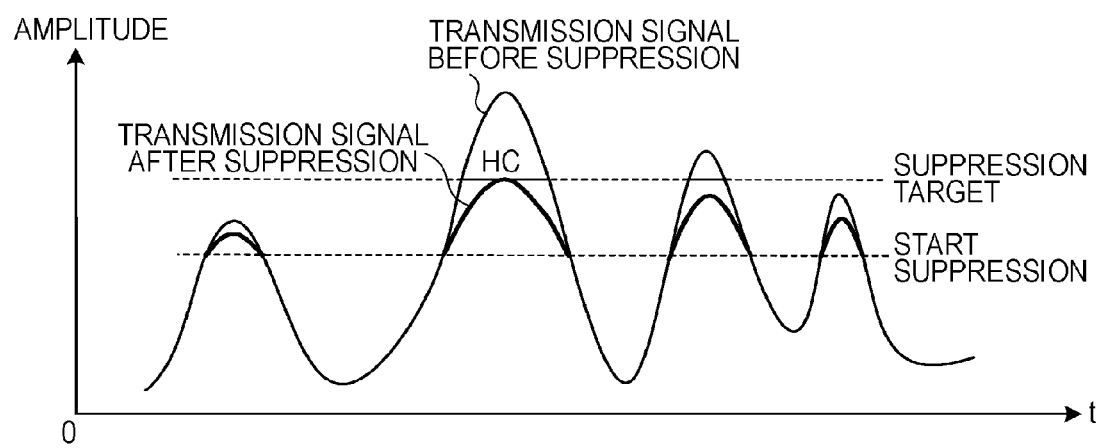
FIG. 6 is a graph that illustrates the state of waveform before and after peak suppression.

In addition, FIG. 6 illustrates a difference in waveform when peak suppression is performed using the function f(x) and when peak suppression is performed by hard clipping. As illustrated in FIG. 6, the waveform after peak suppression is performed using the function f(x) as a waveform such that the part of the signal that exceeds a suppression start value is suppressed and the maximum peak is suppressed to a suppression target.

The D/A conversion unit 13 digital-to-analog converts the transmission signal output from the peak suppressing unit 12, and outputs the converted transmission signal to the wireless transmission unit 14. The wireless transmission unit 14 converts the frequency of the transmission signal output from the D/A conversion unit 13, and transmits a wireless signal.

(Configuration of Receiver)

Next, the configuration of the receiver 20 illustrated in FIG. 7 will be described with reference to FIG. 7 to FIG. 10.

Figure 7:
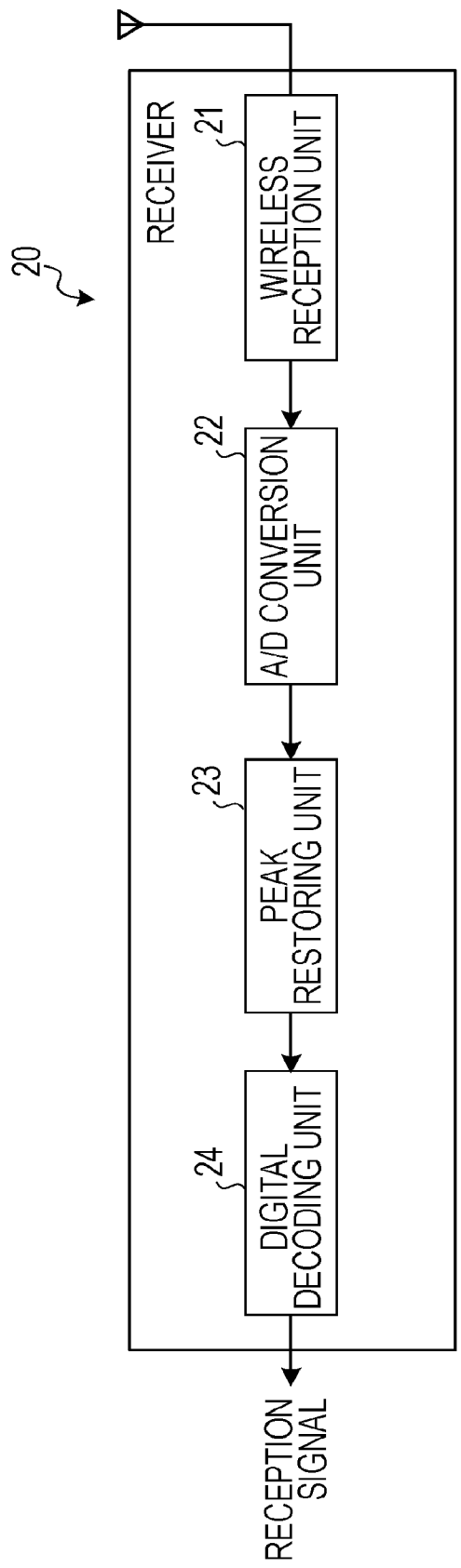
FIG. 7 is a block diagram that illustrates the configuration of a receiver according to the first embodiment.

As illustrated in FIG. 7, the receiver 20 includes a wireless reception unit 21, an A/D conversion unit 22, a peak restoring unit 23, and a digital decoding unit 24, and receives a signal from the transmitter 20 through an antenna. Hereinafter, the processes of these units will be described.

The wireless reception unit 21 converts the frequency of the received signal, and outputs the converted signal to the A/D conversion unit 22 as a reception signal. The A/D conversion unit 22 performs analog-to-digital conversion of the reception signal, and outputs the converted reception signal to the peak restoring unit 23.

Figure 8:
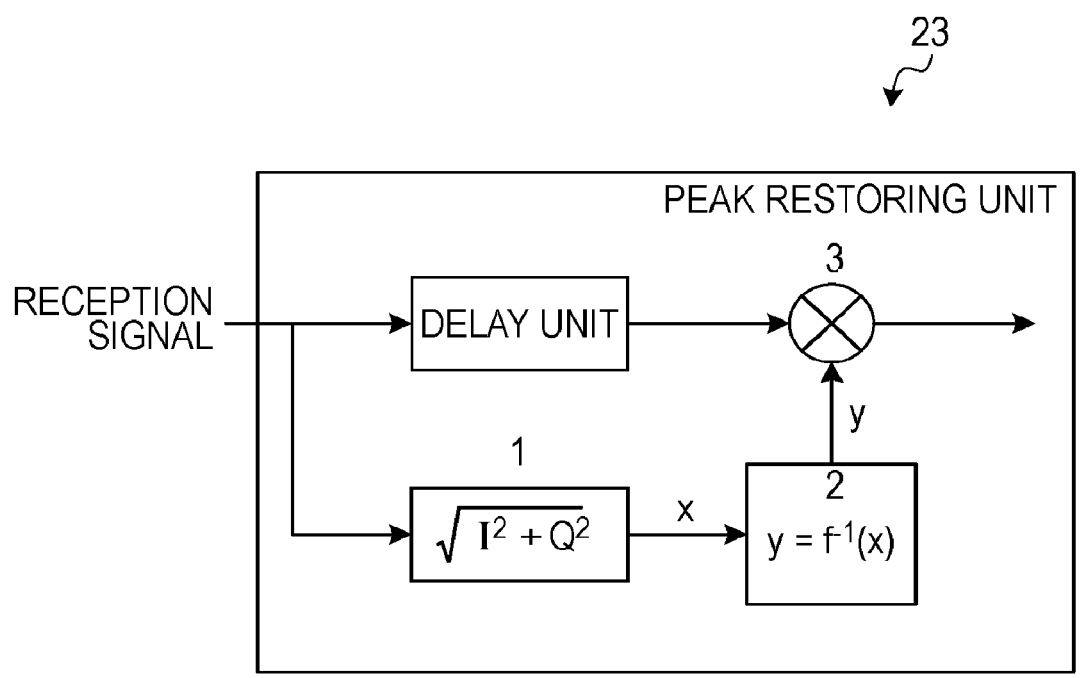
FIG. 8 is a view illustrating a peak restoring unit of the receiver.

The peak restoring unit 23 restores the suppressed peak of the reception signal using an inverse function f−1(x), and outputs the peak-restored reception signal to the digital decoding unit 24. As illustrated in FIG. 8, the peak restoring unit 23 accepts the reception signal output from the A/D conversion unit 22, and obtains an amplitude value (x) of the reception signal, which is a complex number (see operation 1 in FIG. 8).

The peak restoring unit 23 obtains a peak restored signal (y) using the function f−1(x) having an inverted characteristic to the function used by the peak suppressing unit 12 of the above described transmitter 10 (see operation 2 in FIG. 8). The peak restoring unit 23 multiplies the reception signal, which is delayed by a delay unit, by the peak restored signal (gain) to restore a peak (see operation 3 in FIG. 8).

Figure 9:
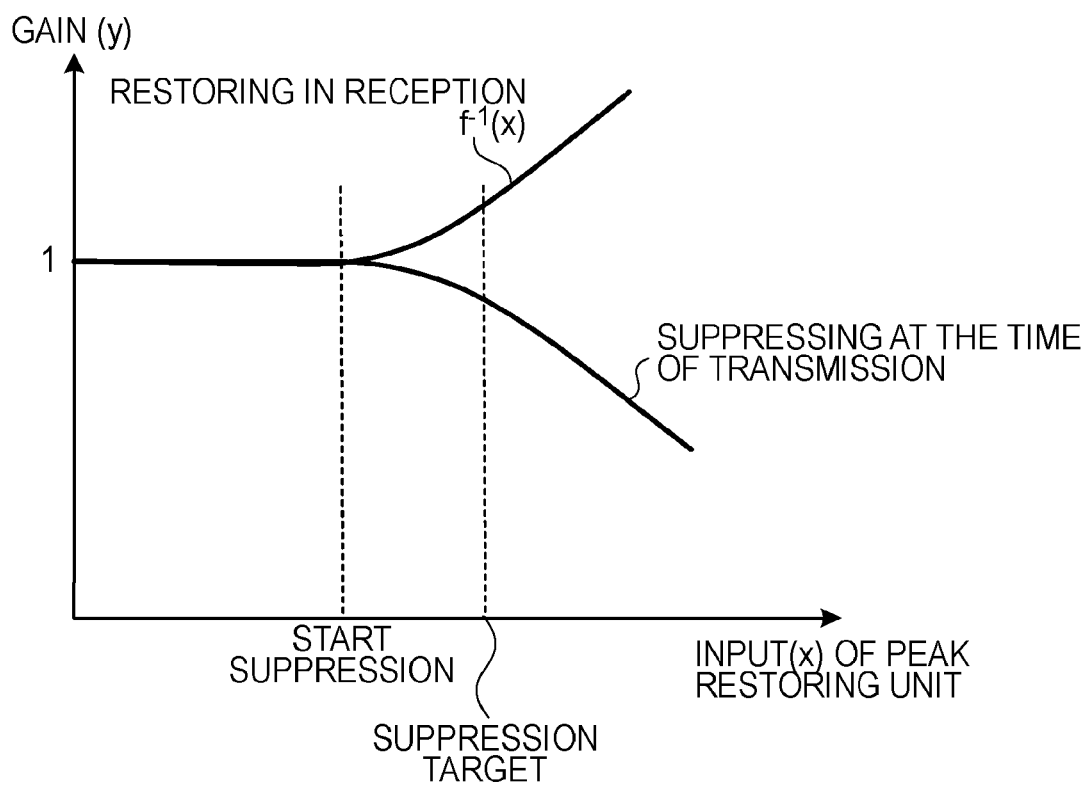
FIG. 9 is a graph illustrating the process of the peak restoring unit.
Figure 10:
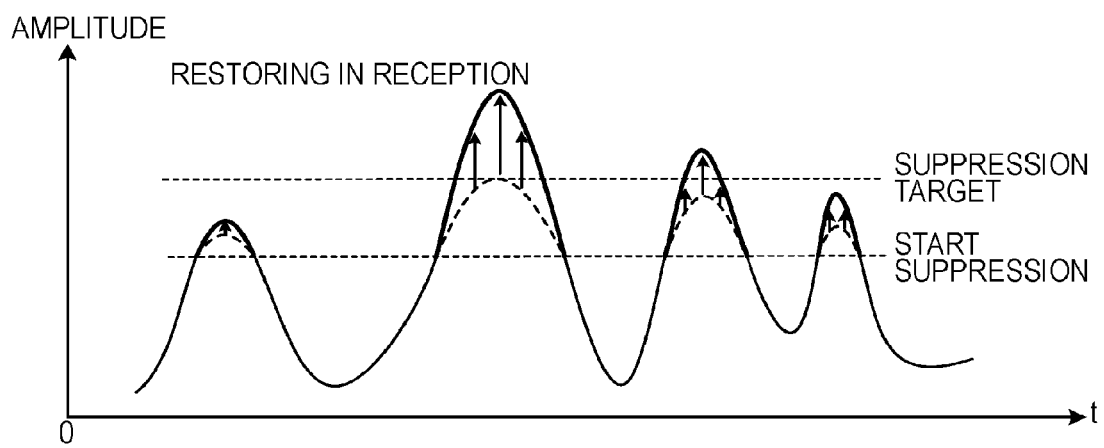
FIG. 10 is a graph that illustrates a comparison between the waveforms of input/output signals of the peak restoring unit.

Here, the process of the peak restoring unit will be described with reference to FIG. 9 and FIG. 10. As illustrated in FIG. 9, the peak restoring unit 23 restores a signal component over which peak suppression has been executed by the peak suppressing unit 12 of the transmitter 10. As illustrated in FIG. 10, in the peak restoring unit 23, an input signal waveform of the peak restoring unit is compared with an output signal waveform of the peak restoring unit to restore a peak having an amplitude value higher than the level of "start suppression".

The digital decoding unit 24 digitally decodes the reception signal output from the peak restoring unit 23, and outputs the decoded reception data to the outside.

(Processes Executed by Transmitter)

Next, the processes executed by the transmitter 10 according to the first embodiment will be described with reference to FIG. 11.

Figure 11:
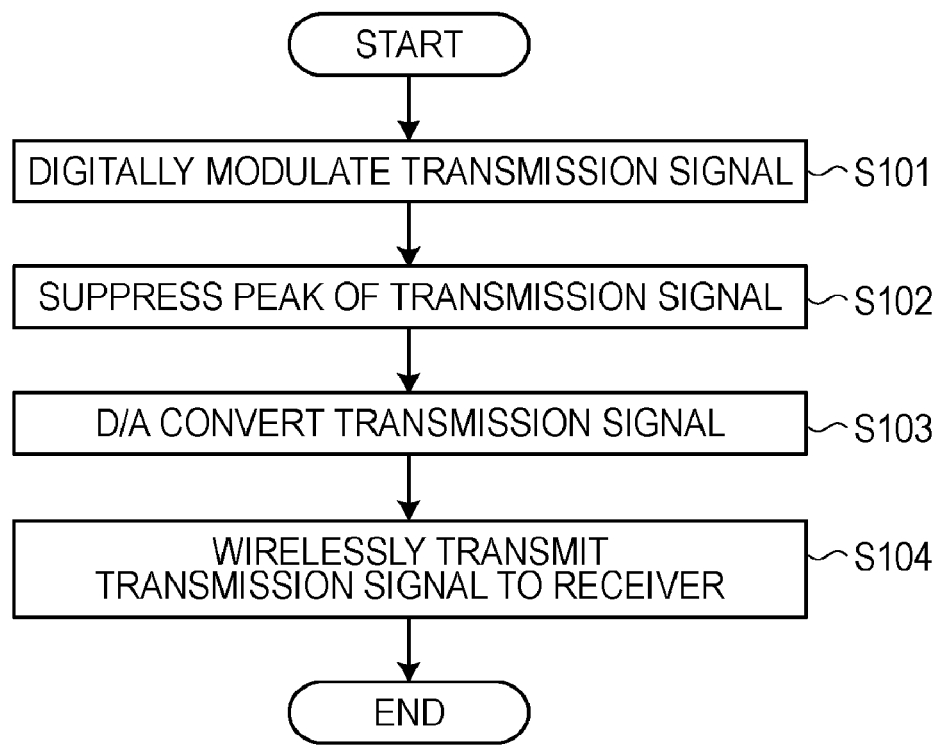
FIG. 11 is a flowchart that illustrates the operation of the transmitter according to the first embodiment.

As illustrated in FIG. 11, the transmitter 10 digitally modulates an input transmission signal (step S101). Then, the transmitter 10 starts suppression over the transmission signal when a suppression start value is lower than a suppression target value, and suppresses a peak of the signal using the function f(x) having gain characteristics such that only a peak amplitude value attains the suppression target value (step S102).

Subsequently, the transmitter 10 performs digital-to-analog conversion of the transmission signal, the peak of which is suppressed (step S103). After that, the transmitter 10 converts the frequency of the digital-to-analog converted transmission signal to transmit a wireless signal (step S104).

(Processes Executed by Receiver)

Next, the processes executed by the receiver 20 according to the first embodiment will be described with reference to FIG. 12.

Figure 12:
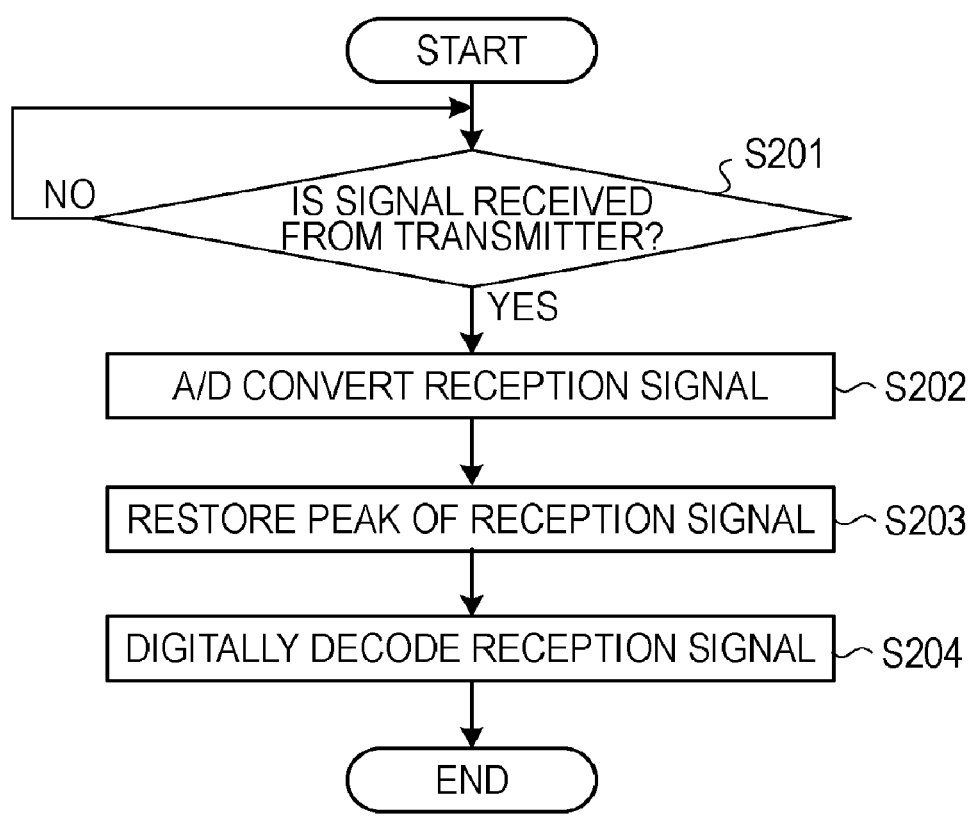
FIG. 12 is a flowchart that illustrates the operation of the receiver according to the first embodiment.

As illustrated in FIG. 12, as the receiver 20 receives a signal from the transmitter (Yes in step S201), the receiver 20 converts the frequency of the received signal, and performs analog-to-digital conversion of the reception signal the frequency of which is converted (step S202). Then, the receiver 20 restores the suppressed peak of the reception signal using the inverse function f−1(x) (step S203). After that, the receiver 20 digitally decodes the restored reception signal (step S204).

As described above, in the first embodiment, suppression is started when a suppression start value is lower than a suppression target value, and suppresses a peak using the function having gain characteristics such that only a peak amplitude value attains the suppression target value, thus restoring the suppressed peak using the inverse function. Thus, peak suppression is executed such that information related to peak suppression executed by the transmitter 10 is not transmitted and the waveform of the peak is maintained. As a result, it is possible to restore a peak at the reception side while improving signal quality at the reception side. Thus, it is possible to improve frequency use efficiency.

In addition, according to the first embodiment, the transmitter 10 calculates a peak suppression signal (gain), which is a degree of peak suppression, using the function, and suppresses a peak based on the peak suppression signal. In addition, the receiver 20 calculates a degree of peak restoration using the inverse function, and restores a peak based on the degree of peak restoration. As a result, it is not necessary to transmit or receive information related to peak suppression, and it is also possible to improve frequency use efficiency while improving signal quality at the reception side.

Second Embodiment

Figure 13:
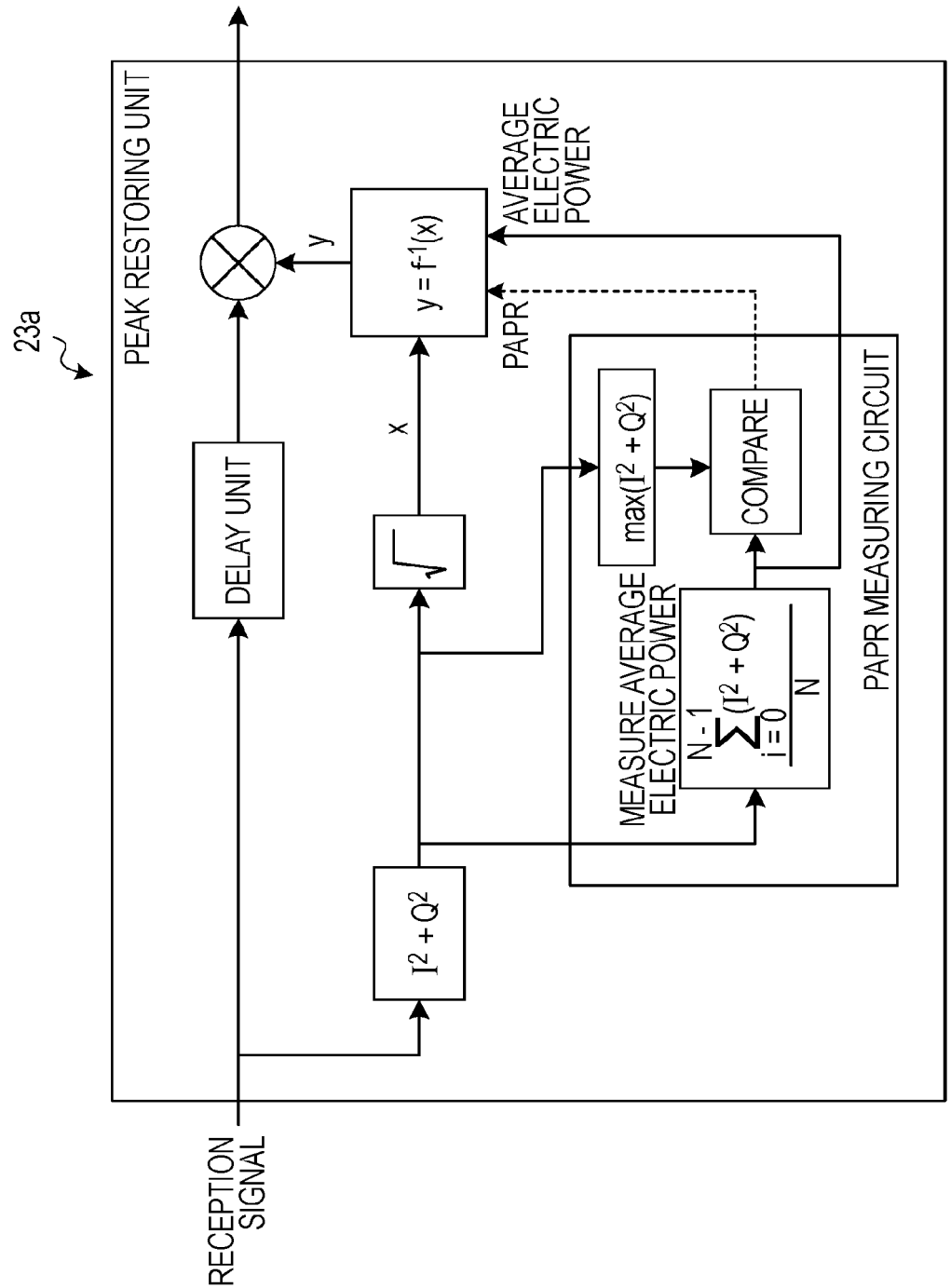
FIG. 13 is a view illustrating a receiver according to a second embodiment.

Next, a second embodiment will be described with reference to FIG. 13 and FIG. 14. In the second embodiment, a receiver determines the amount of peak suppression, and adjusts the amount of peak restoration based on the determined amount of peak suppression. Other configurations are similar to those of the first embodiment.

First, the configuration and processes of a receiver 20a according to the second embodiment will be described. As illustrated in FIG. 13, a peak restoring unit 23a of the receiver 20a differs from the peak restoring unit 23 of the receiver 20 illustrated in FIG. 8 in that a peak-to-average power ratio (PAPR) measuring circuit is additionally provided.

With the above configuration, the peak restoring unit 23a of the receiver 20a obtains amplitude values (x) of a reception signal, which is a complex number, as in the case of the first embodiment, and measures an average electric power and a PAPR, which is different from the first embodiment.

Specifically, the peak restoring unit 23a compares a peak (max(I2+Q2)) with an average electric power as a process of measuring the PAPR, and measures a ratio of the average electric power to the peak as the PAPR. Subsequently, the peak restoring unit 23a determines the amount of peak suppression (suppression target value and suppression start value) based on the average electric power and the PAPR, and sets the determined suppression target value and suppression start value to adjust the amount of peak restoration.

Figure 14:
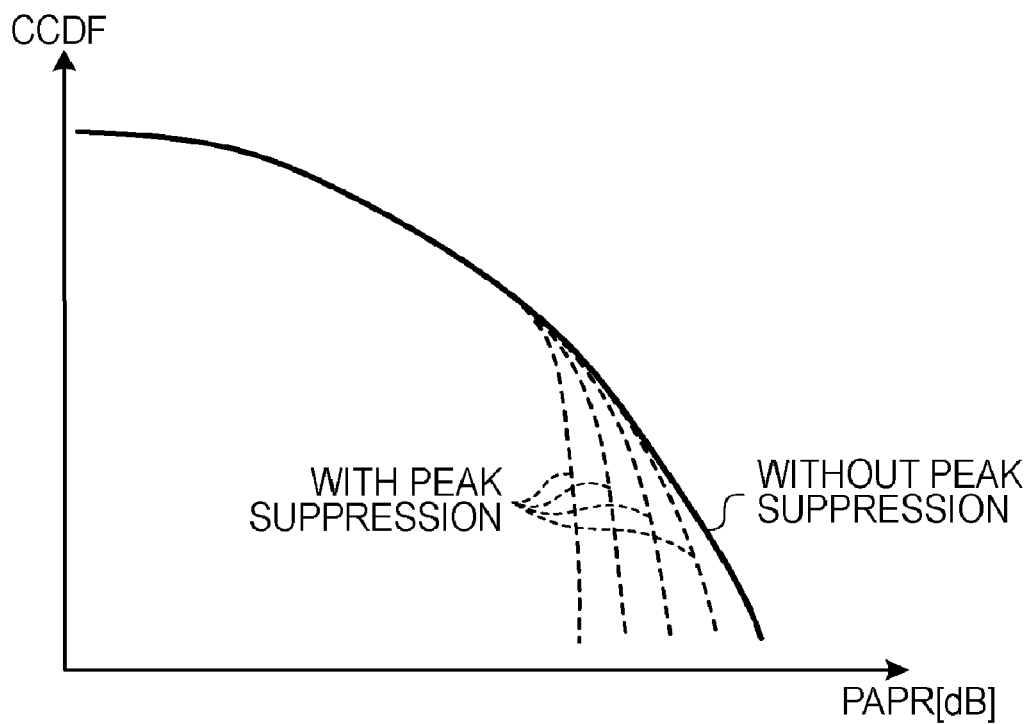
FIG. 14 is a view illustrating a difference in PAPR in a reception signal suppressed by different peak suppression amounts.

Here, FIG. 14 illustrates a relationship between a PAPR and a CCDF (Complementary Cumulative Distribution Function). As illustrated in FIG. 14, when the amount of peak suppression set by the transmitter varies, the value of PAPR also varies. For example, as the amount of peak suppression increases (as the suppression target value decreases or as the suppression start value decreases), the PAPR decreases. On the other hand, when no peak suppression is executed, the PAPR reaches a maximum value.

That is, when the amount of peak suppression (suppression target value and suppression start value) set in the transmitter is not set in the receiver 20a, the receiver 20a determines the amount of peak suppression and adjusts the amount of peak restoration.

In this way, in the second embodiment, the receiver 20a measures a ratio of an average electric power to a peak to determine the amount of peak suppression, and then adjusts the amount of peak restoration based on the amount of peak suppression. Thus, even when the amount of peak suppression (suppression target value and suppression start value) set in the transmitter is not set in the receiver 20a, it is possible to appropriately restore a peak.

Third Embodiment

Next, a third embodiment will be described with reference to FIG. 15. In the first embodiment, the peak suppressing unit 12 obtains an amplitude value (x), calculates a peak suppression signal (y) using the function f(x) and then multiplies a transmission signal by the peak suppression signal (gain) to suppress a peak. In the third embodiment, the peak suppressing unit 12 includes a memory that stores an amplitude value (x) and a peak suppression signal (y) in correlation with each other, and data is read from the memory. Other configurations are similar to those of the first embodiment.

Figure 15:
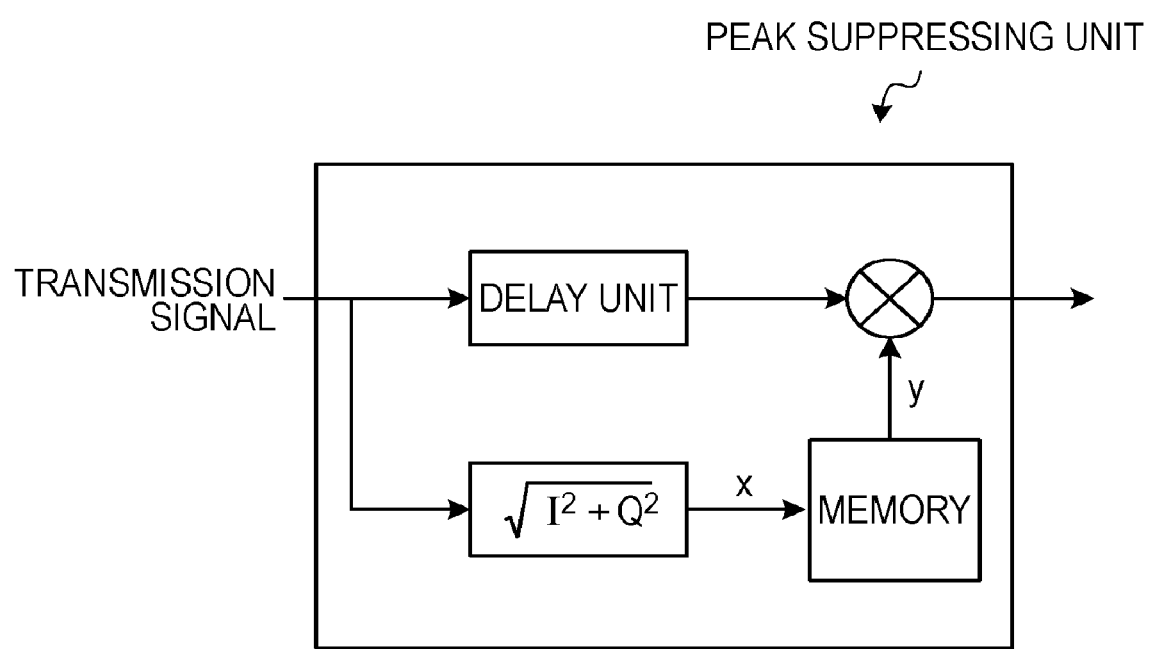
FIG. 15 is a view illustrating a transmitter according to a third embodiment.

As illustrated in FIG. 15, the peak suppressing unit of the transmitter includes a memory that stores an amplitude value (x) and a peak suppression signal (y) in correlation with each other. The peak suppressing unit of the transmitter obtains an amplitude value (x) of a transmission signal, which is a complex number, reads a peak suppression signal (y) corresponding to the amplitude value (x) from the memory, and multiplies the transmission signal by the peak suppression signal to suppress a peak. The receiver may also execute a similar process to restore a peak.

In this way, the transmitter reads a peak suppression signal corresponding to an amplitude value of a transmitting signal from the memory that stores an amplitude value and a peak suppression signal in correlation with each other, and then suppresses a peak of the transmitting signal based on the peak suppression signal. In addition, the receiver reads a peak restoration signal corresponding to an amplitude value of a received signal from the memory that stores an amplitude value and a peak restoration signal in correlation with each other, and restores a peak of the received signal based on the peak restoration signal. As a result, it is possible to easily suppress and restore a peak.

As described above, according to the first to third embodiments, it is possible to improve frequency use efficiency without transmitting peak suppression information. Note that in the first to third embodiments, as a system configuration, for example, the components of the transmitter 10 and receiver 20 illustrated in FIG. 3 and FIG. 7 are functional concepts, and are not necessarily physically configured as illustrated in the drawings. In addition, for example, the entire or a selected portion of processing functions executed in the components (for example, the peak suppressing unit 12 or the peak restoring unit 23) of the transmitter 10 and receiver 20 may be implemented by a CPU, a program executed for analysis in the CPU, and the like.

For example, various processes described in the first embodiment (see FIG. 11, FIG. 12, and the like) may be implemented in such a manner that a prepared program is executed on a processing apparatus, such as a CPU (Central Processing Unit), provided for a communication device (computer).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments have been described in detail, it should be understood that the various changes, substitutions, and alterations could be made hereto without departing from the spirit and scope of the invention.

What is claimed is:

1. A peak suppressing and restoring method comprising:
    suppressing, by a transmitter, a peak of a signal by starting suppression when a suppression start value is lower than a suppression target value and using a function of a gain characteristic such that a peak amplitude value attains the suppression target value; and
    restoring, by a receiver, the suppressed peak of the signal using an inverse function of the function of the gain characteristic that is stored in the receiver.

2. The peak suppressing and restoring method according to claim 1, further comprising:
   determining a degree of peak suppression by measuring a ratio of an average electric power to a peak, and suppressing the peak of the signal based on the degree of peak suppression, and
   adjusting a degree of peak restoration based on the degree of peak suppression, and restoring the peak of the signal based on the degree of peak restoration.

3. The peak suppressing and restoring method according to claim 1, further comprising:
   calculating a degree of peak suppression using the function of the gain characteristic, and suppressing the peak of the signal based on the degree of peak suppression, and
   calculating a degree of peak restoration using the inverse function, and restoring the peak of the signal based on the degree of peak restoration.

4. The peak suppressing and restoring method according to claim 1, further comprising:
   reading a degree of peak suppression corresponding to an amplitude value of a transmitting signal from a peak suppression storage unit that stores an amplitude value and a degree of peak suppression in correlation with each other, and suppressing the peak of the transmitting signal based on the degree of peak suppression, and
   reading a degree of peak restoration corresponding to an amplitude value of a received signal from a peak restoration storage unit that stores an amplitude value and a degree of peak restoration in correlation with each other, and
   restoring the peak of the received signal based on the degree of peak restoration.

5. A transmitter comprising:
   a peak suppressing unit configured to start suppressing a peak of a signal when a suppression start value is lower than a suppression target value and to suppress the peak of the signal using a function of gain characteristics such that a peak amplitude value attains the suppression target value; and
   a transmission unit configured to transmit the signal, the peak of which is suppressed by the peak suppressing unit, to a receiver that stores an inverse function of the function of gain characteristics and restores the suppressed peak by the stored inverse function.

6. A receiver comprising:
   a reception unit configured to receive a signal, a peak of which is suppressed by a peak suppressing process, from a transmitter; and
   a peak restoring unit configured to store an inverse function of a function of a gain characteristic used in the peak suppressing process at the transmitter, and to restore the peak of the received signal by using the stored inverse function.

7. A peak suppressing and restoring system comprising:
   a transmitter that includes a peak suppressing unit configured to start suppression when a suppression start value is lower than a suppression target value and to suppress a peak using a function of a gain characteristic such that a peak amplitude value attains the suppression target value; and
   a receiver that includes a peak restoring unit configured to store an inverse function of the function of the gain characteristic used in the peak suppressing process at the transmitter, and to restore the peak suppressed by the peak suppressing unit by using the stored inverse function.

8. The peak suppressing and restoring system according to claim 7, wherein
   the peak suppressing unit determines a degree of peak suppression by measuring a ratio of an average electric power to the peak, and
   the peak restoring unit adjusts a degree of peak restoration based on the degree of peak suppression.

9. The peak suppressing and restoring system according to claim 7, wherein
   the peak suppressing unit calculates the degree of peak suppression using the function of the gain characteristic, and suppresses the peak of a signal based on the degree of peak suppression, and
   the peak restoring unit calculates the degree of peak restoration using the inverse function, and restores the peak of the signal based on the degree of peak restoration.

10. The peak suppressing and restoring system according to claim 7, wherein
    the peak suppressing unit reads the degree of peak suppression corresponding to an amplitude value of a transmitting signal from a peak suppression storage unit that stores an amplitude value and the degree of peak suppression in correlation with each other, and suppresses the peak of the transmitting signal based on the degree of peak suppression, and
    the peak restoring unit reads the degree of peak restoration corresponding to an amplitude value of a received signal from a peak restoration storage unit that stores the amplitude value and the degree of peak restoration in correlation with each other, and restores the peak of the received signal based on the degree of peak restoration.

* * * * *